United States Patent
Elahie et al.

(10) Patent No.: US 12,211,239 B2
(45) Date of Patent: Jan. 28, 2025

(54) SYSTEMS AND METHODS FOR COMPRESSING MOTION IN A POINT CLOUD

(71) Applicant: Illuscio, Inc., Culver City, CA (US)

(72) Inventors: Dwayne Elahie, Montreal (CA); Nolan Taeksang Yoo, Seattle, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/626,936

(22) Filed: Apr. 4, 2024

(65) Prior Publication Data

US 2024/0428465 A1 Dec. 26, 2024

Related U.S. Application Data

(63) Continuation of application No. 18/339,815, filed on Jun. 22, 2023, now Pat. No. 11,954,892.

(51) Int. Cl.
*G06T 9/00* (2006.01)
*G06T 7/246* (2017.01)

(52) U.S. Cl.
CPC .............. *G06T 9/001* (2013.01); *G06T 7/251* (2017.01)

(58) Field of Classification Search
CPC ................................. G06T 9/001; G06T 7/251
See application file for complete search history.

(56) References Cited

U.S. PATENT DOCUMENTS

| 11,443,482 B1 * | 9/2022 | Monaghan ............ G06T 17/005 |
| 11,954,892 B1 * | 4/2024 | Elahie ..................... G06T 9/001 |
| 2015/0138185 A1 | 5/2015 | Huang et al. |

OTHER PUBLICATIONS

Linfei Pan et al., "Compression and Completion of Animated Point Clouds using Topological Properties of the Manifold", Pub. 2020, International conference in 3D, IEEEE. (Year: 2020).*
Linfei Pan et al. "Compression and Completion of Animated Point Clouds using Topological Properties of the Manifold", Pub. 2020, International conference in 3D, IEEE (Year: 2020).*
Moving Picture Experts Group (MPEG), "MPEG Point Cloud Compression", "Introduction to the MPEG-PCC project", https://mpeg-pcc.org/.

* cited by examiner

*Primary Examiner* — Mekonen T Bekele
(74) *Attorney, Agent, or Firm* — Ansari Katiraei LLP; Arman Katiraei; Sadiq Ansari (57) ABSTRACT

Disclosed is a system and associated methods for compressing motion within an animated point cloud. The resulting compressed file encodes different transforms that recreate the motion of different sets of points across different point clouds or frames of the animation in place of the data for the different sets of points from the different point clouds. The compression involves detecting a motion that changes positioning of a set of points between a first point cloud and subsequent point clouds of an uncompressed encoding of two or more frames of an animation. The compression further involves defining a transform that models the motion, and generating a compressed animated point cloud by encoding the data of the first point cloud in the compressed animated point cloud, and by replacing the data for the set of points in the one or more subsequent point clouds with the transform.

19 Claims, 8 Drawing Sheets

SYSTEMS AND METHODS FOR COMPRESSING MOTION IN A POINT CLOUD

CLAIM OF BENEFIT TO RELATED APPLICATIONS

This application is a continuation of U.S. nonprovisional application Ser. No. 18/339,815 with the title "Systems and Methods for Compressing Motion in a Point Cloud", filed Jun. 22, 2023 and issued as U.S. Pat. No. 11,954,892. The contents of application Ser. No. 18/339,815 are hereby incorporated by reference.

BACKGROUND

An animation is created by rapidly presenting a sequence of images (e.g., 24 or 30 images per second) with one or more parts that change, move, or differ from corresponding parts of a previous image. The rapid presentation of changing images creates the illusion of motion or movement.

The number of images and the resolution or data associated with each image in the animation cause the animation file to be large in size. The file size increases for highly detailed or higher resolution animations of the same duration.

High Efficiency Video Coding ("HEVC"), Moving Picture Experts Group ("MPEG"), and other encoding or compression techniques have been developed to reduce file sizes of animations and/or videos. These encoding or compression techniques apply to two-dimensional ("2D") image formats, and compress the image data by retaining one image as a keyframe and by storing the changes that occur in subsequent images in place of the image data of the subsequent images.

However, these encoding or compression techniques do not apply to point clouds and/or other three-dimensional ("3D") formats that may contain motion, may produce a 3D animation, and/or may be used to create a video by traversing through the 3D space of the point cloud. Animated point clouds and/or other animated 3D formats are significantly larger in size than a set of 2D images that define a 2D animation or video, and therefore require a new or different encoding or compression technique in order to distribute, stream, or otherwise access the animated point clouds and/or other animated 3D formats across data networks or limited bandwidth connections.

DETAILED DESCRIPTION OF PREFERRED EMBODIMENTS

The following detailed description refers to the accompanying drawings. The same reference numbers in different drawings may identify the same or similar elements.

Provided are systems and associated methods for compressing motion in a point cloud. The systems and associated methods encode an animated point cloud or a point cloud that contains an animation in a compressed format that replaces the positional and non-positional data for different sets of animated points with different transforms that recreate the animation produced by the different sets of animated points.

A compression system analyzes the animated point cloud for motion. The animated point cloud may be defined as a set of point clouds. Each point cloud in the set of point clouds may have one or more points that change, move, or differ from corresponding parts of a previous point cloud in the set of point clouds. The compression system detects the different sets of points in the animated point cloud that are associated with or used to create the motion.

The compression system models the motion from the different sets points with a set of transforms. Specifically, the compression system defines a transform to emulate, recreate, and/or track the movement of a set of points in the set of point clouds.

In some embodiments, the transform is defined as a pivot point, a joint, and/or a connector that moves from a starting position to an ending position. The pivot point, joint, and/or connector specify a range of motion that tracks the movement of the set of points. In some embodiments, the range of motion for the transform is defined with a starting position and an ending position.

In some embodiments, the transform is defined as a function. The function generates a curve, shape, or other output that tracks the movement of the set of points.

The transform may also be defined with a weighting to adjust the amount by which different points in the set of points move relative to one another or the transform. In other words, the weighting may change the impact that the transform has on different points of the set of points. The transform may also be defined with a time parameter and a start time. The time parameter may specify the time or number of frames to complete the movement represented by the transform. The start time may specify the time in the animation at which to commence the movement represented by the transform.

The compression system links the set of points to the transform as part of generating a compressed representation of the animated point cloud. In some embodiments, the compressed representation of the animated point cloud is defined with the positional and non-positional data for every point in a first point cloud of the set of point clouds, and replaces the positional and non-positional data for the set of points in subsequent frames of the animation or subsequent point clouds in the set of points clouds with the transform. The first point cloud serves as a reference point cloud, and the transform defines a motion that is applied to the linked set of points from the first point cloud. Accordingly, the compressed representation of the animated point cloud is encoded without repeatedly defining the set of points in each other point cloud of the set of point clouds with a slight difference in the positional data that tracks the motion in each point cloud. Instead, the set of points are defined once in the encoding of the compressed animated point cloud, and the transform generates the slight difference in the positional data that creates the animation.

Unlike compressed animations that are generated using High Efficiency Video Coding ("HEVC"), Moving Picture Experts Group ("MPEG"), and/or other video encoding or compression techniques, the compressed representation of the animated point cloud is not time dependent. For instance, the compression system does not define a transform for every frame or image of an animation. Instead, the compression system may define one transform, a starting position and an ending position of the transform, and/or a time parameter in order to animate a set of points over multiple frames or images of the entire animation. A decoding or recipient device may recreate the animation of the set of points for each frame of the animation by adjusting the initial positioning of the set of points, that are defined once in the first point cloud encoded to the compressed animated point cloud, according to the transform that is linked to the set of points in the compressed animated point cloud, and the starting position, ending position, and time parameter of the transform.

Figure 1:
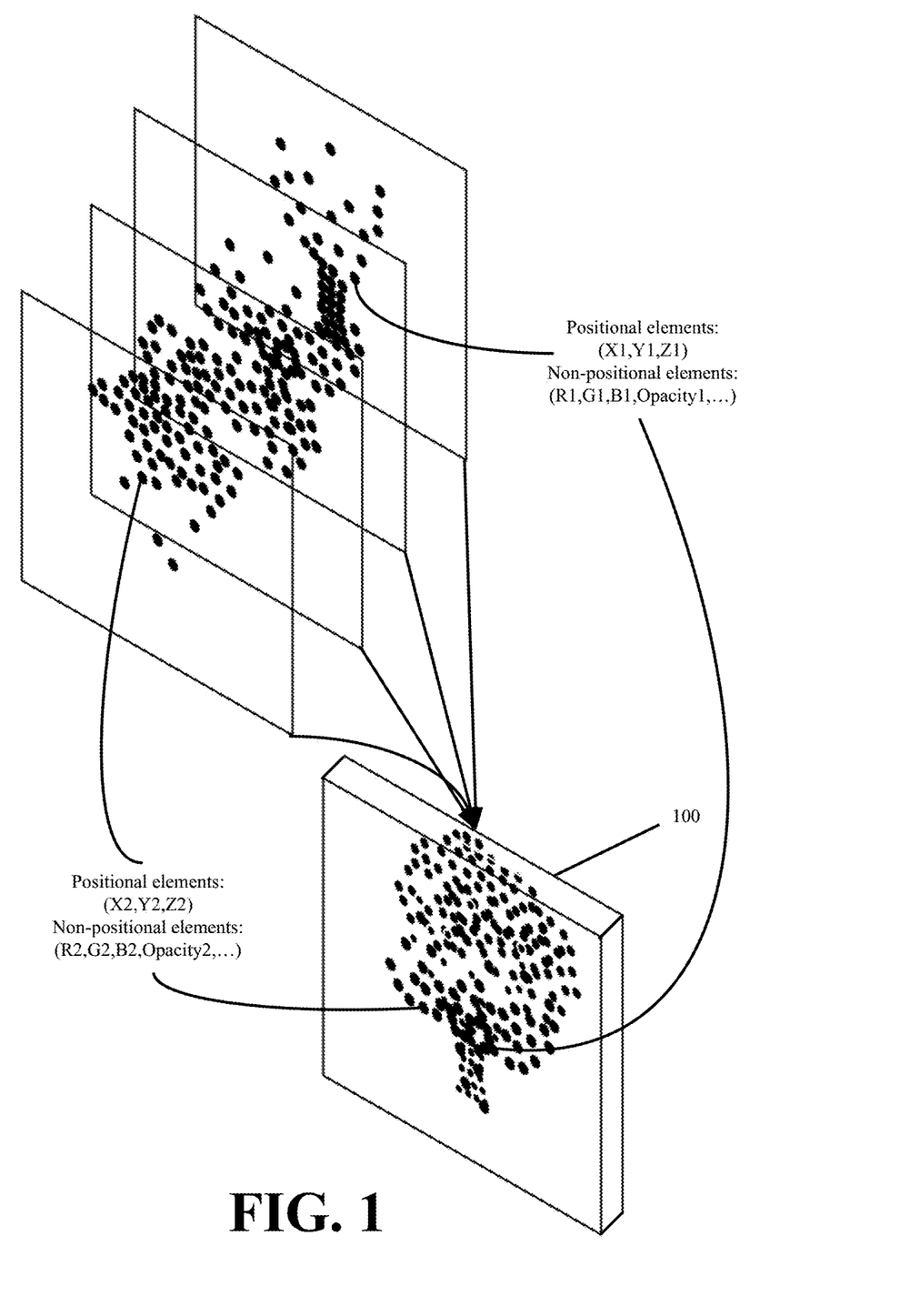
FIG. 1 illustrates an example point cloud in accordance with some embodiments presented herein.

FIG. 1 illustrates an example point cloud 100 in accordance with some embodiments presented herein. Multiple such point clouds 100 may be used to create an animated point cloud. Each point cloud 100 of an animated point cloud represent a different frame of the animation by slightly varying the positioning of one or more points relative to a previous point cloud in the sequence of point clouds forming the animated point cloud.

The points of point cloud 100 differ from pixels of a two-dimensional ("2D") image, because certain regions of point cloud 100 have no points, lower densities of points, and/or higher densities of points based on varying amounts of visual information that is detected, scanned, or created at those regions. Additionally, the position of the point cloud points are defined in a three-dimensional ("3D") space using x, y, and z coordinate values. In contrast, pixels of a 2D image are defined in a 2D space and have a uniform density or fixed arrangement that is defined by the resolution of the 2D image. In other words, the point cloud points may have a non-uniform placement or positioning, whereas the 2D image has pixel data for each pixel of a defined resolution (e.g., 640×480, 800×600, etc.).

Each point cloud point is defined with a plurality of elements. The plurality of elements includes a first set of positional elements and a second set of non-positional or descriptive elements. Values for the positional elements and/or non-positional elements of a particular point may be calculated from the return intensity of the light, laser, or signal reflecting off a corresponding surface and returning to the scanning device.

The positional elements include coordinates within a 3D space. For instance, each point cloud point includes x-coordinate, y-coordinate, and z-coordinate elements to capture the position of a corresponding physical point from a surface, feature, or object. The positional elements may further include a surface normal. The surface normal defines the angle, direction, or orientation that the surface, feature, or object represented by the point faces or is exposed to. More specifically, the surface normal is a line, ray, or vector that is perpendicular to the scanned surface, feature, or object represented by the point. In some embodiments, the positional elements may be defined for created points as opposed to being measured or scanned from physical objects.

The non-positional elements include information about the detected characteristics of the surface, feature, or object at a corresponding position in the scanned scene. The characteristics may correspond to a detected color (e.g., visual characteristics). The color may be represented using red, green, blue ("RGB"), and/or other color component values. In some embodiments, a point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface, feature, or object. In some embodiments, the non-positional elements directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic". These material properties may be associated with different values for the chrominance, hardness, translucence, reflectivity, luminance, and/or other visual characteristics of the point defined with a material property.

Each point cloud point includes an array of elements. The array of elements may provide the positioning of the point in a 3D space (e.g., positional element) as well as one or more characteristics (e.g., non-positional elements) of that point. For instance, a point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Figure 2:
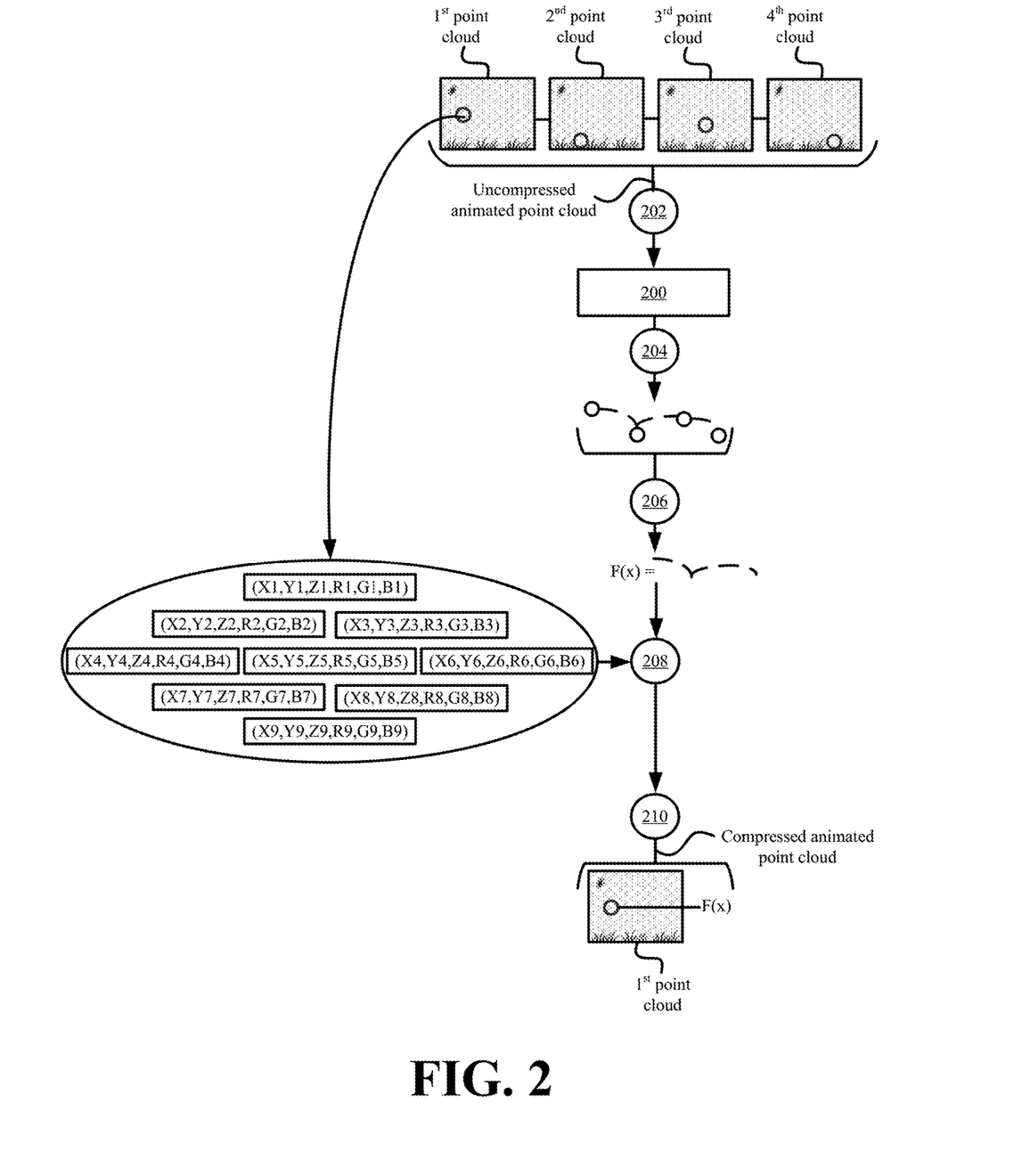
FIG. 2 illustrates an example of compressing an animated point cloud in accordance with some embodiments presented herein.

FIG. 2 illustrates an example of compressing an animated point cloud in accordance with some embodiments presented herein. Compression system 200 receives (at 202) an animated point cloud.

The animated point cloud may be a sequential set of point clouds. Each point cloud in the sequential set of point clouds may define a different 2D or 3D frame or image of the animation. Accordingly, each point cloud in the sequential set of point clouds may include some of the same points at the same positions and other points that move or are adjusted from one point cloud to the next in order to produce the animation.

Compression system 200 detects (at 204) motion in the sequential set of point clouds. In some embodiments, compression system 200 detects (at 204) motion by comparing the positioning of common points in the sequential set of point clouds. For instance, compression system 200 detects (at 204) motion when a first set of points with a particular set of colors (e.g., values defined for the non-positional elements) have a first position in a first point cloud and have shifted or are offset by less than a threshold amount from the first position to a second position in a second point cloud or in one or more later point clouds of the sequential set of point clouds. Accordingly, detecting (at 204) the motion includes determining different sets of points that move or change in different subsets of the sequential sets of point clouds.

Compression system 200 defines (at 206) a different transform to model the motion associated with each set of points that move or change from one point cloud to one or more subsequent point clouds in the sequential set of point clouds. In some embodiments, defining (at 208) the transform includes deriving a function that tracks, emulates, or recreates the motion with a threshold degree of accuracy. For instance, if a set of points move according to a curved arc, defining (at 208) the transform includes determining the function that creates the same or a similar curved arc with the same curvature, length, and/or other arc properties. In some other embodiments, defining (at 208) the transform includes creating a pivot point and/or an extension from the pivot point that tracks the movement of a particular set of points. In any case, the transform is a singular construct that models some or all of the movement associated with a set of two or more points across two or more of the sequential set of point clouds.

Compression system 200 links (at 208) each set of points associated with a detected (at 204) motion to at least one transform that is defined (at 206) to recreate that motion. Linking a set of points may include associating a unique index of each point from the set of points to an array or other definition of the transform. Alternatively, linking the set of points may include associating a unique identifier of the transform to each point of the set of points. For instance, the set of points in a first or reference point cloud may include a non-positional element that is defined with the unique identifier of one or more transforms that model the motion of that set of points.

Linking (at 208) each set of points may also include defining one or more weight values that are associated with each transform. A single weight value may be defined for each transform. The weight value may specify an impact or an amount of motion that the transform attributes to each point of a linked set of points. For instance, the transform may be defined as a pivot point with an extension and a set of points may be linked to that transform. Points from the linked set of points that are positioned next to the pivot point or the extension may receive 100% of the movement associated with the transform based on the one or more weight values, whereas points from the linked set of points that are further from the pivot point or the extension move by a lesser amount than those closer to the pivot point or the extension based on the one or more weight values.

In some embodiments, each point from the linked set of points may be defined with an individual weight value. For instance, a point may include a non-positional element that is defined with the unique identifier of a particular transform and with a weight value that limits the application of the particular transform to that point. Specifically, the weight value may specify how much movement defined by the particular transform is transferred or applied to the point position.

Compression system 200 generates (at 210) the compressed animated point cloud based on at least one reference point cloud from the sequential set of point clouds, the defined (at 206) transforms, and the linking (at 208) of different sets of points to different transforms. The compressed animated point cloud is significantly smaller in size than the animated point cloud because the compressed animated point cloud replaces the data from one or more point clouds in the sequential set of point clouds that follow the at least one reference point cloud with the transforms. For instance, compression system 200 may encode the compressed animated point cloud with the data from a first point cloud in the sequential set of point clouds. The first point cloud is a reference point cloud that contains all the data needed to generate a first 2D or 3D image or frame of the animation. Compression system 200 may also encode the compressed animated point cloud with the defined (at 206) transforms that move or animate different sets of points from the first point cloud similar to the motion that is detected (at 204) for those different sets of points in the sequential set of points. Specifically, the transforms apply to the linked sets of points of the reference point cloud, and recreate the animation or detected (at 204) motion by repositioning the different sets of points. In doing so, the compressed animated point cloud is encoded without separately storing the point cloud data for generating each frame or image of the animation. Other static points that do not move or change in the sequential set of point clouds may also be defined once in the reference point cloud of the compressed animated point cloud encoding since the same data for the static points may be reused to create the subsequent frames or images of the animation.

In some embodiments, generating (at 210) the compressed animated point cloud may include encoding a reference point cloud after a specified number of frames or images of the animation or upon detected a threshold amount of motion. For instance, compression system 200 may encode a reference point cloud at every second of the animation and may generate the animation that occurs over the presented frames or images of each second (e.g., 30 frames per second) based on the transforms defined for the corresponding reference point cloud. In other words, the same reference point cloud may not be used for the entirety of the animation. Instead, a first reference point cloud and a first set of transforms linked to points of the first reference point cloud may be used to encode a first part of an animation (e.g., first two seconds or first sixty frames of the animation), and a second reference point cloud and a second set of transforms linked to points of the second reference point cloud may be used to encode a second part of the animation (e.g., third and fourth seconds or the next sixty frames of the animation).

Figure 3:
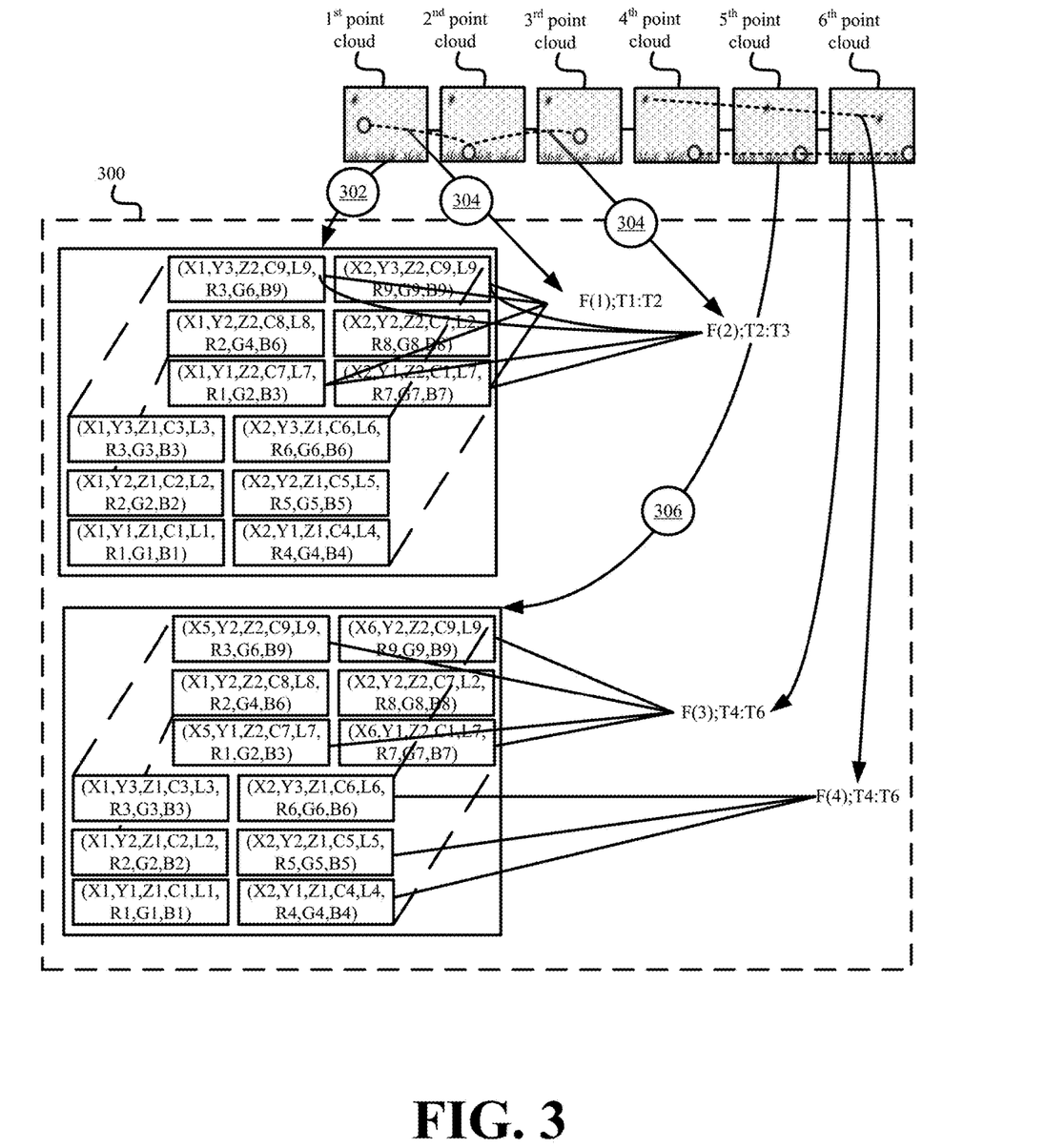
FIG. 3 illustrates an example of a compressed animated point cloud in accordance with some embodiments presented herein.

FIG. 3 illustrates an example of compressed animated point cloud 300 in accordance with some embodiments presented herein. Compressed animated point cloud 300 is defined (at 302) with points of a first point cloud. The points of the first point cloud are defined with positional elements and non-positional elements for creating a first frame of the animation. The first frame may be a 2D or 3D image.

Compressed animated point cloud 300 is also defined (at 304) with a set of transforms that model the motion of different sets of points from the first point cloud across one or more other point clouds of a sequential set of point clouds from an uncompressed animated point cloud. In this figure, the set of transforms animate a set of points that represent a ball in the first point cloud to match the movement of the set of points or the ball in a second point cloud and a third point cloud defined as part of the uncompressed animated point cloud.

Each transform may be linked to different sets of the points from the first point cloud. Each transform may specify a different movement that is uniformly or non-uniformly applied to the set of points that is linked to that transform based on one or more weights that may be associated with the transform or each point of the linked subset of points.

Each transform may be associated with a time parameter that specifies the duration with which to apply the modeled movement to the linked set of points. For instance, a time parameter of one second that is associated with a first transform of an animation rendered at 30 frames per second may involve partitioning the movement of the first transform into 30 sub-movements, and applying a different one of the 30 sub-movements to the linked set of points in every frame over the one second interval. Similarly, a time parameter of two seconds that is associated with a second transform of the animation rendered at 30 frames per second may involve partitioning the movement of the second transform into 60 sub-movements, and applying a different one of the 60 sub-movements to the linked set of points in every frame over the two second interval.

Since the transforms are time independent (e.g., are not linked to specific frames of the animation), the animation quality may be improved by generating the animation frames from the same transforms at a higher frame rate. For instance, a transform may be defined with a time parameter of one second. Accordingly, the transform performs a motion that lasts one second. However, the quality of that motion may be improved by increasing the frame rate or the number of frames with which to present the motion in one second. When the animation is rendered at 15 frames per second, the motion represented by the transform is divided into 15 sub-movements with each sub-movement of the motion being presented in a different frame of the 15 frames presented in one second of the animation. When that same animation is rendered at 60 frames per second, the motion represented by the same transform is divided into 60 sub-movements with each sub-movement of the motion being presented in a different frame of the 60 frames presented in one second of the animation. In other words, the same transform is used to animate the same sets of points over the same time interval. However, the frame rate at which the animation is rendered increases or decreases the number of frames over which the motion represented by the transform is presented.

In some embodiments, the same points may be linked to two or more transforms that define different movements for the same time of the animation. In some such embodiments, the points are adjusted according to each of the linked transforms and/or different weightings associated with each linked transform.

Compressed animated point cloud 300 may be defined (at 306) with points of another point cloud after the definition for the points of the first point cloud and the set of transforms that are linked to different sets of the points from the first point cloud. As shown in FIG. 3, compressed animated point cloud 300 is defined with the points of the first point cloud, the set of transforms that adjust the points of the first point cloud in order to create the motion from a second point cloud and a third point cloud, and is then defined (at 306) with the points of a fourth point cloud that represents a frame after the third point cloud in the uncompressed animated point cloud. The fourth point cloud may be a reference point cloud for additional animation or a next set of movements. Accordingly, compressed animated point cloud 300 may be encoded (at 308) with a second set of transforms to animate different sets of points from the fourth point cloud with the motion that is defined in a fifth point cloud and a sixth point cloud without encoding the data from the fifth point cloud and the sixth point cloud to compressed animated point cloud 300.

Accordingly, compressed animated point cloud 300 is encoded with the point cloud data from the first and fourth point clouds in the sequential set of point clouds from an uncompressed animated point cloud. However, compressed animated point cloud 300 replaces the point cloud data from the second, third, fifth, and sixth point clouds in the sequential set of point clouds with two sets of transforms. As a result, compressed animated point cloud 300 contains significantly less data than the uncompressed animated point cloud while still encoding the necessary data to recreate the animation from the uncompressed animated point cloud.

Each set of transforms may replace the data from any number of point clouds in compressed animated point cloud 300 provided that the set of transforms sufficiently model the motion that occurs over the replaced point clouds. For instance, the replaced point clouds may contain the data for generating one hundred frames involving the continuous motion of the same object. A single transform or a single set of transforms may recreate the continuous motion of the same object by linking to and adjusting the positioning the set of points from a single reference point cloud that collectively form that object in a first frame of the animation.

Compression system 200 may stream compressed animated point cloud 300 to a recipient device that requests access to the animation. Compressed animated point cloud 300 may be streamed in less time than the data from the sequential set of point clouds that form the uncompressed animated point cloud because compressed animated point cloud 300 is encoded with significantly fewer bits or less data than the sequential set of point clouds.

Upon receiving the data for the first point cloud of compressed animated point cloud 300, the recipient device may generate and/or render a first frame or image of the animation. Upon receiving the transforms that are defined and linked to different sets of points from the first point cloud, the recipient device may generate and/or render multiple subsequent frames or images of the animation. When streaming the uncompressed animated point cloud, the recipient device may only generate and/or render individual frames or images of the animation as each point cloud containing the data for that frame or image is received.

Figure 4:
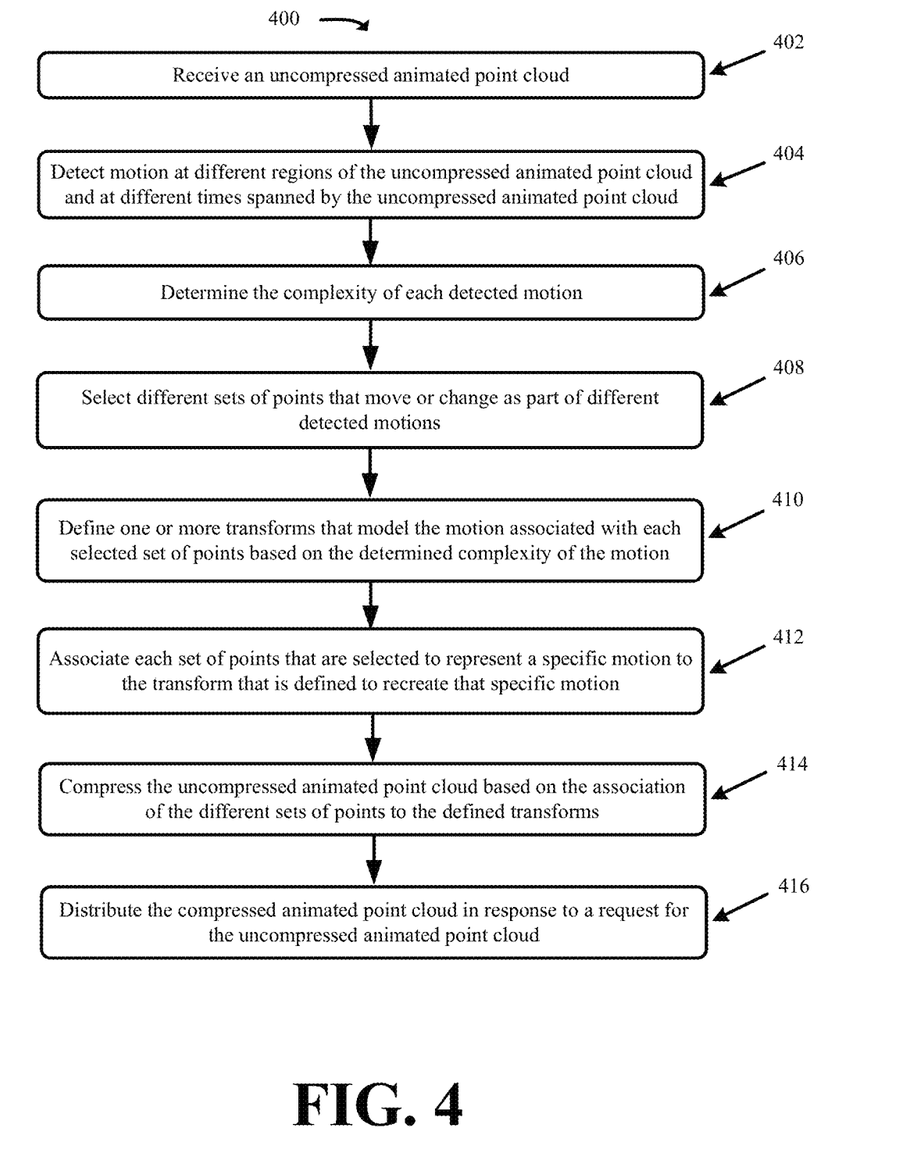
FIG. 4 presents a process for compressing the motion within an animated point cloud using different transforms in accordance with some embodiments presented herein.

FIG. 4 presents a process 400 for compressing the motion within an animated point cloud using different transforms in accordance with some embodiments presented herein. Process 400 is implemented by compression system 200.

Compression system 200 includes one or more devices with processor, memory, storage, network, and/or other hardware resources that compress, decompress, edit, interact, render, and/or otherwise process point clouds and/or other 3D files. Compression system 200 may run locally on a user device, may run in the cloud, or as part of a centralized system that streams the compressed animated point clouds to different user devices.

Process 400 includes receiving (at 402) an uncompressed animated point cloud. The uncompressed animated point cloud may be defined as a sequential set of two or more point clouds with each of the two or more point clouds producing different frames or images of the represented animation. For instance, a camera, scanner, or other device may perform a volumetric scan of a scene at a given rate (e.g., 24 scans per second), and each scan may correspond to a different point cloud of the sequential set of two or more point clouds.

Process 400 includes detecting (at 404) motion at different regions of the uncompressed animated point cloud and at different times spanned by the uncompressed animated point cloud. Compression system 200 may use different techniques to perform the motion detection (at 404).

In some embodiments, the motion detection (at 404) involves comparing the positioning of similarly colored points in similar regions of the sequential set of point clouds to determine if the points move and represent motion in the uncompressed animated point cloud. In some embodiments, the motion detection (at 404) involves comparing the coloring or non-positional elements of points at the same position in different point clouds to determine if the coloring changes and is an indication of motion. In some embodiments, the motion detection (at 404) involves rendering the sequential set of two or more point clouds and comparing the images rendered from each point cloud to determine the parts of the images that change and/or that represent motion in the uncompressed animated point cloud. In some embodiments, the motion detection (at 404) involves applying one or more artificial intelligence and/or machine learning ("AI/ML") techniques to the uncompressed animated point cloud. The AI/ML techniques may perform shape, pattern, and/or other commonality detection within the point clouds, and may determine if the positioning of the detected shapes, patterns, and/or other commonality change from one point cloud to one or more other point clouds in the sequential set of two or more point clouds.

Process 400 includes determining (at 406) the complexity of each detected (at 404) motion. The complexity of motion may be based on the number of times the motion changes direction, whether the motion is a repeating or non-repeating pattern, whether the motion involves movements that occur at different speeds or rates, and/or whether the motion involves continuous movements or a set of discontinuous movements. In some embodiments, compression system 200 determines (at 406) the complexity of each detected (at 404) motion by comparing the motion to samples of simple motions, and determining whether the motion may be represented by a single sample of a simple motion or a combination of different samples of simple motions.

Process 400 includes selecting (at 408) different sets of points that move or change as part of different detected (at 404) motions. For instance, motion within the uncompressed animated point cloud may involve changing the positioning and/or coloring of a set of points across two or more point clouds. Compression system 200 detects (at 406) the motion, and then selects (at 408) the set of points associated with that motion.

Selecting (at 408) the different sets of points may include tagging each point of the different sets of points with a motion identifier, or tagging each point of a set of points associated with a particular motion with a common identifier. The tagging may differentiate points associated with motion from static points that do not change from one point cloud to a next or from one frame or image of the animation to a next.

Process 400 includes defining (at 410) one or more transforms that model the motion associated with each selected (at 408) set of points based on the determined (at 406) complexity of the motion. For instance, a simple motion that moves about a continuous arc may be represented by a single transform, whereas a complex motion that involves discontinuous movements in different directions may be represented by multiple transforms that each model a different one of the discontinuous movements.

In some embodiments, the transform that is defined for a particular set of points is a function that creates a shape, curve, or other form that tracks the motion of the particular set of points. The function may be a mathematical expression, formula, or other equation. The function may accept inputs for a starting position and ending position of the created shape, curve, or other form. In some other embodiments, the transform is a new construct that is added to a reference point cloud. In some such embodiments, the transform may be defined as one or more of a pivot point, joint, and/or connector. The pivot point may be defined with a specific range of motion. The joint or connector may connect to the pivot point about one end or at some point along the joint or connector, and may move according to the specific range of motion defined for the pivot point.

Compression system 200 may use one or more AI/ML techniques to define (at 410) the different transforms. For instance, compression system 200 may enter the motion associated with a particular set of points into a unsupervised machine learning model. The unsupervised machine learning model may simplify the representation of the motion by generating a curve or line that tracks the motion. The unsupervised machine learning model determines and/or configures a function to recreate the representative curve or line. For instance, the unsupervised machine learning model may compare the curve or line to curves or lines that are generated by a set of predefined functions, may select the predefined function that matches the curve or line tracking the motion with the least deviation, and may tune parameters of the predefined function to better align the resulting curve or line with the curve or line tracking the motion in the uncompressed animated point cloud.

Depending on the complexity of the motion and/or the number of points affected by a particular motion, the unsupervised machine learning model may define (at 410) two or more transforms to more accurately recreate the complex motion. Accordingly, the unsupervised machine learning model may divide the particular motion into smaller movements that may be more accurately represented by two or more functions, pivot points, and/or joints. For instance, compression system 200 may detect a hand motion that involves different simultaneous movements of different fingers. Rather than define a single transform to model the movement of all fingers, compression system 200 may divide the complex hand motion into simpler finger movements, and may define (at 4010) a different transform to model the movement of each finger separately.

In some such embodiments, the AI/ML techniques may analyze the motion for different pivot points or points at which the motion changes. The AI/ML techniques may then define (at 410) a different transform to model the motion from one pivot point to another.

Each transform may be defined (at 410) with a starting position and an ending position, and a time parameter for completing the modeled motion from the starting position to the ending position. The starting position and the ending position may be defined as different positional coordinates in the 3D space of the uncompressed animated point cloud. The time parameter May correspond to the number of frames in the animation with which to complete the motion. For instance, the time parameter specifies that the motion occurs over one second, and the animation may be rendered at 30 frames per second. In this example, compression system 200 has 30 frames with which move the set of points associated with the transform from the starting position to the ending position of the transform according to the motion defined by the transform function.

Each transform may also be defined (at 410) with a start time. The start time specifies a time within the animation at which the motion commences. For instance, the start time may specify starting the motion associated with the transform 10 seconds into the animation, and the time parameter of the transform may specify the amount of time or number of frames from the start time over which to complete the motion represented by the transform.

Process 400 includes associating (at 412) each set of points that are selected to represent a specific motion to the transform that is defined (at 410) to recreate that specific motion. Associating (at 412) each set of points may include linking or tagging each point from the set of points to an identifier of the associated transform.

Associating (at 412) each set of points may also include providing a weight for the impact or the amount of motion that is applied from the transform to each specific point of the set of points. In other words, the weight controls the amount with which the positional elements of each point in the set of points is affected by the associated transform. The weight allows the set of points to be unequally adjusted or moved by the same transform. For instance, the transform may compute a positional offset for each frame over the time parameter, and the weight may specify whether the position of a particular point in the set of points is adjusted according to the positional offset or by a lesser amount (e.g., 70% of the positional offset).

Process 400 includes compressing (at 414) the sequential set of point clouds based on the association (at 412) of the different sets of points to the defined (at 410) transforms. Compressing (at 414) the sequential set of point clouds includes generating a compressed animated point cloud that is defined with the data from points of at least a first point cloud in the sequential set of point clouds. The compressed animated point cloud therefore contains the same data for generating a first frame or image of the animation as the uncompressed animated point cloud. However, rather than include the point data from the other point clouds in the sequential set of point clouds, compression system 200 replaces the point data from one or more subsequent point clouds in the sequential set of point clouds with the transforms that model the motion that is applied to different sets of points from the first point cloud in the one or more subsequent point clouds. The transforms specify the motion that moves the different sets of points from their initial positions in the first point cloud to different ending positions associated with the detected (at 404) motion in the one or more subsequent point clouds. Accordingly, the points and their positional and non-positional elements do not have to be redundantly defined for each frame or image of the animation as is done in each point cloud of the sequential set of point clouds forming the uncompressed animated point cloud. Instead, the compressed animated point clouds includes the single definition of the points from the first point cloud and the defined (at 410) transforms that specify how the associated points are repositioned over the duration of the animation.

In some embodiments, compressing (at 414) the sequential set of point cloud includes encoding the compressed animated point cloud with the point data from a subset of the sequential set of point clouds. Periodically encoding the compressed animated point cloud with the point data from different point clouds at different stages in the animation improves the quality of the compressed animation. For instance, the defined (at 410) transforms are models for the detected (at 404) motion. The transforms may reposition the different sets of points with a slight offset from the positions of the same points in the sequential set of point clouds. In other words, the transforms approximate the motion and may not exactly track the motion from the sequential set of point clouds. The point data from the periodically encoded point clouds may be used to correct these offsets at different points in the animation (e.g., every five seconds, after the completion of each motion, etc.). Motion occurring in between the periodically encoded point clouds may again be approximated with another set of transforms, and then realigned or corrected with the point data from the point cloud that is encoded after the set of transforms.

Process 400 includes distributing (at 416) the compressed animated point cloud in response to a request for the uncompressed animated point cloud. Compression system 200 may distribute (at 416) the compressed animated point cloud instead of the uncompressed animated point cloud when the distribution occurs over a data network, low-speed bus, or a limited bandwidth connection. For instance, compression system 200 may distribute (at 416) the compressed animated point cloud when streaming the encoded animation to a remote device or when providing a real-time or live experience and the delays associated with streaming the uncompressed animated point cloud would disrupt or cause the experience to lag and buffer.

The transforms that animate the points from the reference point clouds are not time dependent. Specifically, the transforms do not define a specific change or movement for every frame or image of the animation. Instead, the transforms model a range of motion that is to occur over some duration specified as the time parameter. A recipient device that receives the compressed animated point cloud and that runs an instance of compression system 200 is responsible for decompressing the compressed animated point cloud and generating the motion that occurs in each frame of the animation from the defined transforms instead of having the animation step for each frame defined in the compressed animated point cloud.

Figure 5:
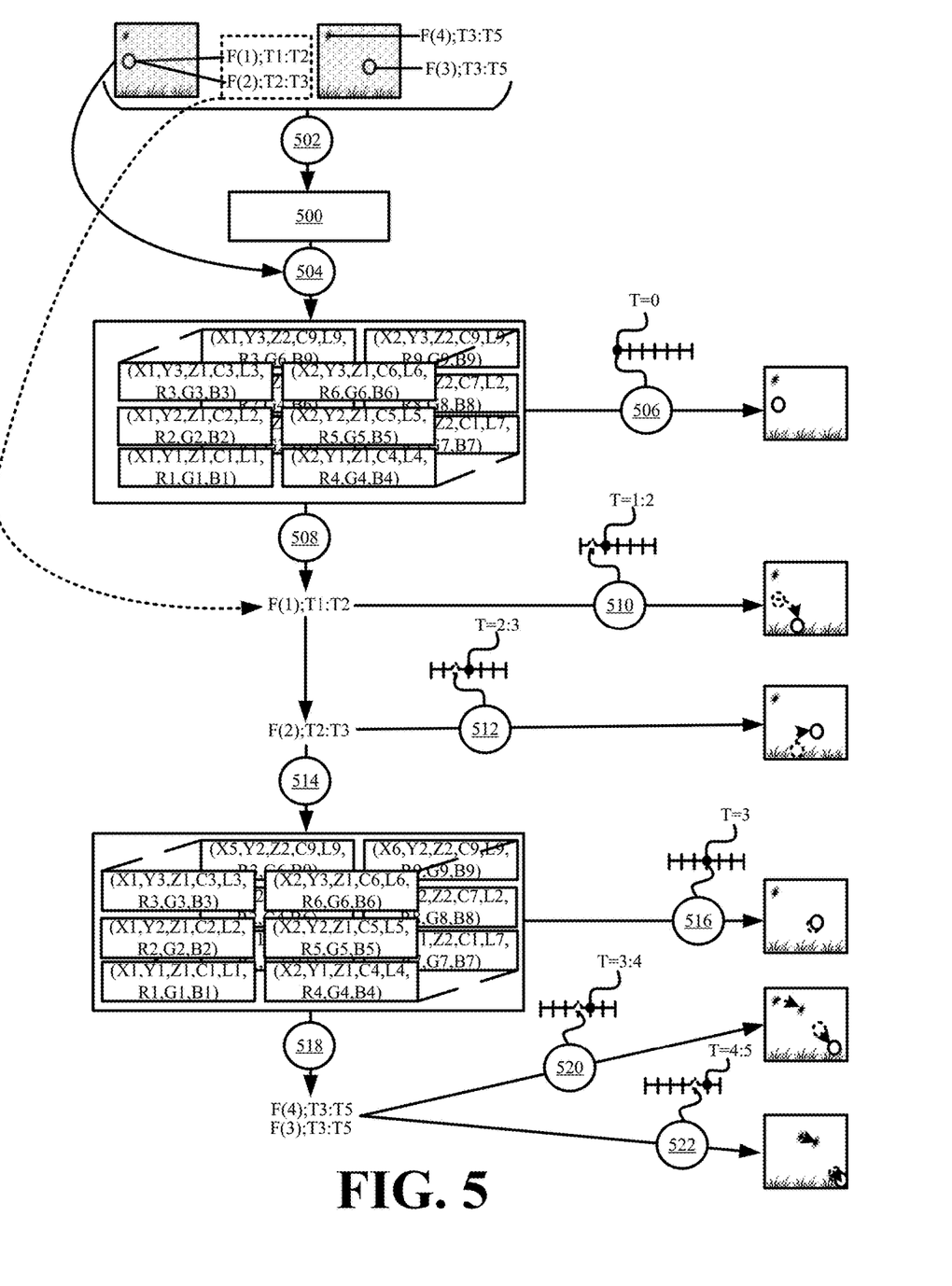
FIG. 5 illustrates an example of generating an animation from a compressed animated point cloud in accordance with some embodiments presented herein.

FIG. 5 illustrates an example of generating an animation from the compressed animated point cloud in accordance with some embodiments presented herein. Device 500 receives (at 502) the compressed animated point cloud. Device 500 may run an instance of compression system 200 when compression system 200 performs the animated point cloud compression and decompression.

Device 500 extracts (at 504) the data for all points of a first reference point cloud from the compressed animated point cloud. The data includes the values that are defined for the positional elements and the non-positional elements of each point in the first reference point cloud. In some embodiments, the compressed animated point cloud is encoded with a particular structure that differentiates between the point cloud data and the transforms that adjust the point cloud data. For instance, the point data associated with a reference point cloud may be encoded before the transforms that apply motion to different sets of points from that reference point cloud in the compressed animated point cloud.

Device 500 generates (at 506) a first frame or image of the animation based on the extracted (at 504) point data. For instance, device 500 renders points or other constructs (e.g., triangles, meshes, polygons, etc.) at the positions defined by the positional elements of the point cloud points, and colorizes or attributes other visual characteristics to the rendered points or other constructs based on the values defined for the non-positional elements of the point cloud points.

Device 500 retrieves (at 508) a set of transforms that have been defined in the compressed animated point cloud and that are linked to different sets of the points from the first reference point cloud. Each transform of the set of transforms may be defined as a function that applies a specific motion or movement to a linked set of points, or may be defined as a pivot point and/or connector that applies a specific motion or movement to a linked set of points based on a range of motion or movement defined for the pivot point and/or connectors. Each transform is linked to two or more points of the first reference point cloud based on the two or more points including the transform identifier as a non-positional element or the transform being defined with an array that contains the indices or identifiers of the two or more points that move in relation to the modeled motion of the transform. In some embodiments, retrieving (at 508) the set of transforms also includes retrieving the starting and ending positions associated with each transform, the time parameter for the length of time to complete the modeled motion, and/or the start time at which to apply the motion of the transform to the linked set of points.

Device 500 tracks the animation time and applies (at 510) a transform when the animation time coincides with the start time of the transform. Applying (at 510) the transform includes adjusting the positional elements of the set of points that are linked to that transform according to the motion that is modeled by that transform, the transform time parameter, and/or weights assigned to the points that adjust the application of the motion to the point position. The time parameter and the starting and ending positions control how fast the motion is applied to the linked set of points and/or how much the position of each point in the linked set of points is adjusted in each frame of the animation spanning the time parameter.

Device 500 continues applying (at 512) the transforms until the animation is complete or data for points of a next reference point cloud are defined in the compressed animated point cloud. Upon reaching (at 514) a next reference point cloud, device 500 adjusts (at 516) the positioning of the points in a last frame or image that were offset from a last reference point cloud by one or more transforms. Specifically, device 500 adjusts (at 516) the positioning of the points according to the positioning defined for the points in the next reference point cloud. In other words, the next reference point cloud contains the point data for generating a frame or image without referencing or relying on the adjusted positioning of points defined in an earlier reference point cloud in the compressed animated point cloud and/or that are adjusted by transforms defined for that earlier reference point cloud.

Device 500 retrieves (at 518) the transforms that are defined for the next reference point cloud. Device 500 applies (at 520 and 522) the transforms to different linked sets of points from the next reference point cloud, causing the different linked sets of points to move or change according to the motion created by the transforms.

Figure 6:
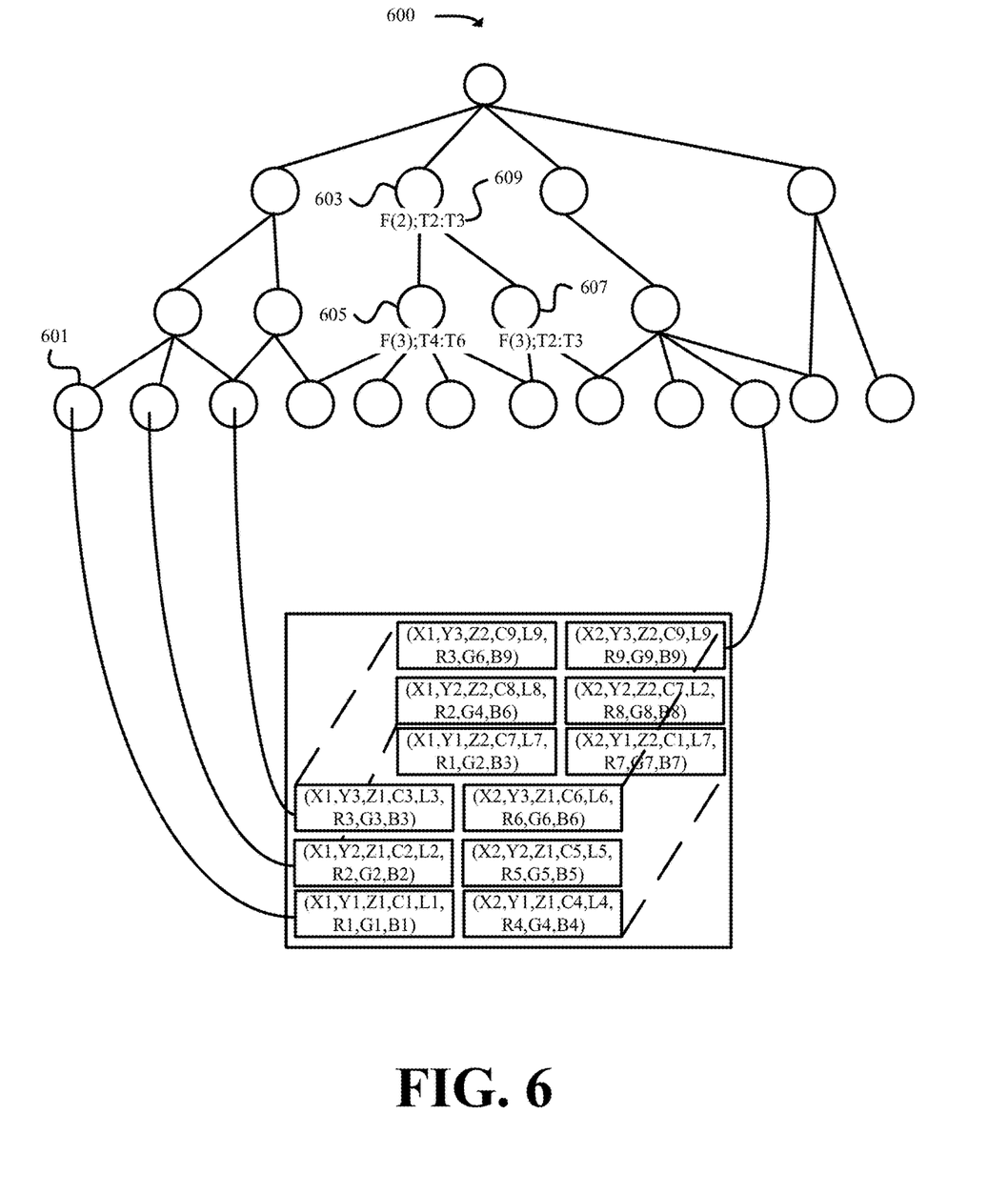
FIG. 6 illustrates an example of a tree-based encoding of a compressed animated point cloud in accordance with some embodiments presented herein.

In some embodiments, the compressed animated point cloud is encoded in a tree format or as a tree-based representation. The tree-based representation contains the point data for the points of a reference point cloud that are to be animated, and connects the point data to nodes that represent the transforms that are applied to those points at different times of the animation.

FIG. 6 illustrates an example of tree-based encoding 600 of a compressed animated point cloud in accordance with some embodiments presented herein. Tree-based encoding 600 includes a set of leaf nodes 601 at the lowest layer of the tree-based encoding.

Each leaf node 601 corresponds to a different point from a reference point cloud. For instance, each leaf node 601 may be defined with the positional elements and the non-positional elements of a different point from the reference point cloud.

Two or more leaf nodes 601 are directly connected or linked to a parent node. The same leaf node may be connected or linked to two or more different parent nodes. Each parent node may similarly be connected to one or more grandparent nodes with each grandparent node being connected or linked to two or more parent nodes. The tree-based encoding may include additional layers of higher-layer nodes until arriving at a root node from which any node of the tree-based encoding may be accessed.

The parent nodes, grandparent nodes, and/or other higher-layer nodes may be defined with the transforms that animate different sets of points represented by leaf nodes 601 that are directly or indirectly connected to those higher-layer nodes. For instance, grandparent node 603 may be indirectly connected to five leaf nodes via two directly connected parent nodes 605 and 607. Grandparent node 603 may be associated with first transform 609 that applies a specific motion to the five points associated with the five indirectly connected leaf nodes 601 at a specific time in the animation. Accordingly, grandparent node 603 may be defined with the particular transform function that models a specific motion, the starting and ending position for the specific motion, the time parameter for the time to complete the specific motion, and/or the start time for when to apply the specific motion to the five points represented by the five leaf nodes 601.

Other transforms may be associated with parent nodes 605 and 607, and may apply additional changes or movements to the same points at the same or different times of the animation. In other words, first transform 609 associated with grandparent node 603 may apply a first adjustment to the positioning of a particular point over a first duration, and another second transform associated with parent node 607 may apply a different second adjustment to the repositioned particular point over the same first duration.

Figure 7:
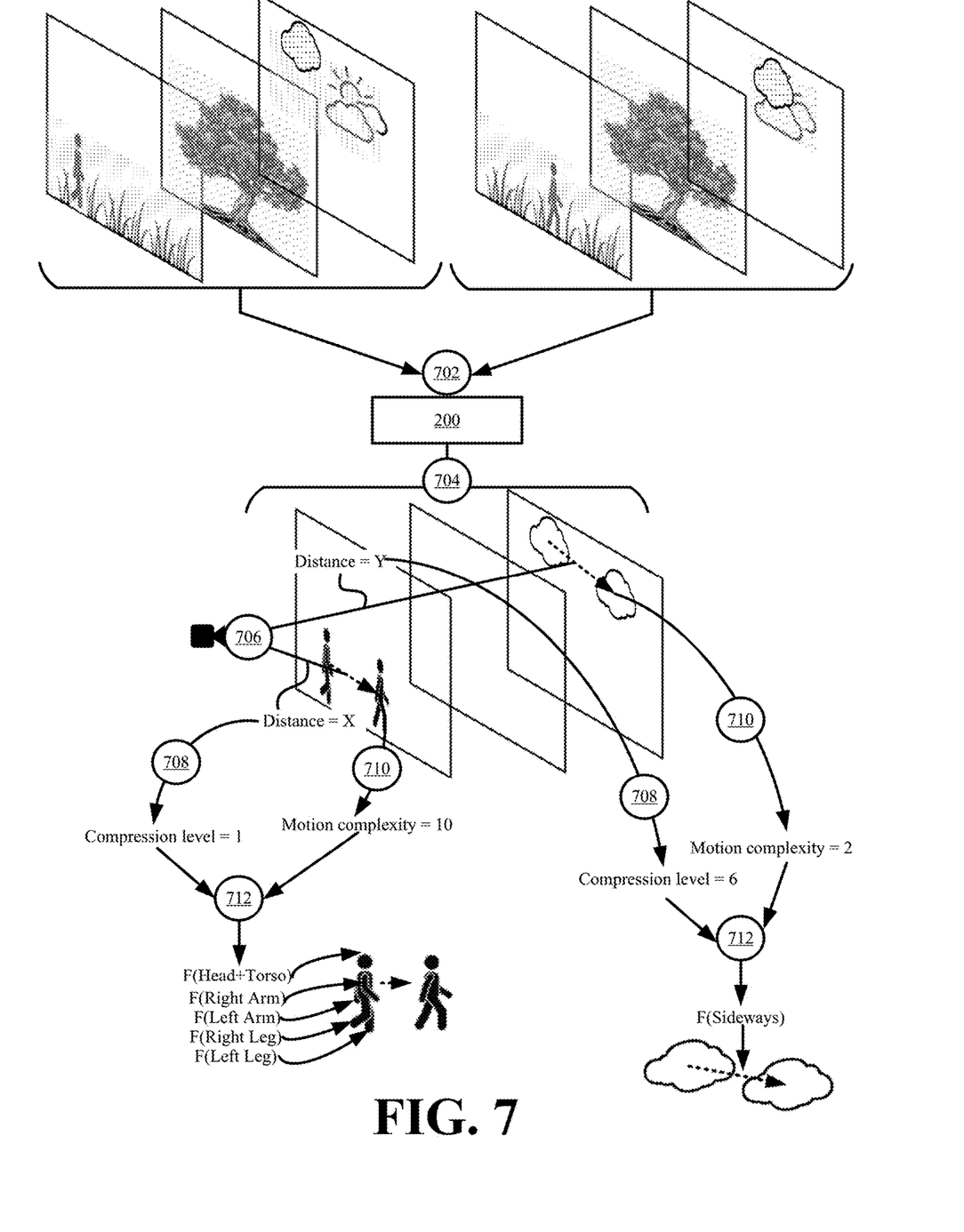
FIG. 7 illustrates an example of selectively compressing motion in an animated point cloud in accordance with some embodiments presented herein.

In some embodiments, compression system 200 performs a selective compression of the points in an animated point cloud. Since the compression and/or transforms perform a lossy modeling of the motion, compression system 200 may apply greater compression to model the motion that occurs in the background or periphery of the animated point cloud, and may apply lesser compression to model the motion that occurs in the foreground or center of the animated point cloud.

Applying lesser compression may include defining more transforms to model the same motion, whereas applying greater compression may include defining fewer transforms to model the same motion. When additional transforms are used to model the same motion, each transform may model a different part of the motion with greater accuracy than when using a single transform to model the entirety of the motion. For instance, compression system 200 may detect a complex motion that is applied to a set of 100 points in the animated point cloud. The complex motion may include a rightward concave movement followed by a downward convex movement. Applying greater compression to the complex motion may include defining a single transform or function to model both the rightward concave movement and the downward convex movement. Applying lesser compression to the complex motion may include defining a first transform or function to model the rightward concave movement, and a second transform or function to separately model the downward convex movement. The first and second transforms more accurately track and recreate the complex motion than the single transform.

If the complex motion occurs in the background or at a distance from the render position that makes the complex motion smaller or harder to see, then the single transform may compress the complex motion with sufficient accuracy. If the complex motion occurs in the foreground or close to the render position that makes the complex motion larger or more noticeable, then compression system 200 may use the first and second transforms to compress the complex motion and more accurately represent the complex motion in compressed form. In other words, inaccurately modeling motion that occurs in the distance or in the background may have a lesser impact to the overall animation than if the inaccurate modeling was for motion occurring in the foreground.

FIG. 7 illustrates an example of selectively compressing motion in an animated point cloud in accordance with some embodiments presented herein. Compression system 200 receives (at 702) the animated point cloud for compression.

Compression system 200 determines (at 704) the different sets of points that move, change positions, or are otherwise associated with motion in the animated point cloud. The different sets of points are associated with different detected motion in the animated point cloud.

Compression system 200 determines (at 706) the distance of the different sets of points from a camera or render position. For instance, compression system 200 determines the z-coordinate position or depth of the different sets of points relative to the camera or render position. Compression system 200 may bias the distance determination based on the number of points linked to a particular detect motion. For instance, motion at a particular distance involving a set of 10 points is less noticeable than the same motion at the particular distance involving a set of 1,000 points.

Compression system 200 selects (at 708) a compression level for the different sets of points based on the determined distance of each set of points from the camera or render position. A higher compression level or a greater amount of compression is selected for a smaller set of points that are a greater distance from the camera or render position than for a larger set of points that are a lesser distance from the camera or render position.

Compression system 200 determines (at 710) the complexity of the motion that is associated with each set of points. The motion complexity may be based on the number of times the motion changes direction, whether the motion is continuous or discontinuous, whether the motion is a repeating pattern, whether the motion involves movements at different speeds or rates, the number of different movements associated with the motion, the number of points associated with the motion, and/or whether the motion remains mostly the same or has other variations.

Compression system 200 selectively compresses (at 712) each set of points with a different number of transforms that is determined based on the selected (at 708) compression level and the determined (at 710) motion complexity. For instance, compression system 200 uses fewer transforms to model a complex motion affecting a particular set of points when the particular set of points are a greater distance from the camera or render position, and uses more transforms to model the same complex motion when the particular set of points are a lesser distance from the camera or render position. Similarly, the motion complexity affects the numbers of transforms that compression system 200 uses to model the motion affecting a particular set of points. Compression system 200 uses more transforms to model a complex motion affecting a particular set of points at a particular distance from the camera or render position, and uses less transforms to model a simpler motion affecting the same particular set of points at the same particular distance from the camera or render position.

Compression system 200 generates a selectively compressed animated point cloud based on the different compression (at 712) applied to the different sets of points and/or the different number of transforms used in compressing motion at different distances with different complexities. The selectively compressed animated point cloud increases the accuracy of the compressed motion without significantly changing the size of the compressed animated point cloud relative to a statically compressed animated point cloud. Specifically, the increased or decreased number of transforms used to selectively compress the motion has minimal overall effect on the file size while having a significant effect on the accuracy of the motion modeled and recreated by the defined transforms.

Figure 8:
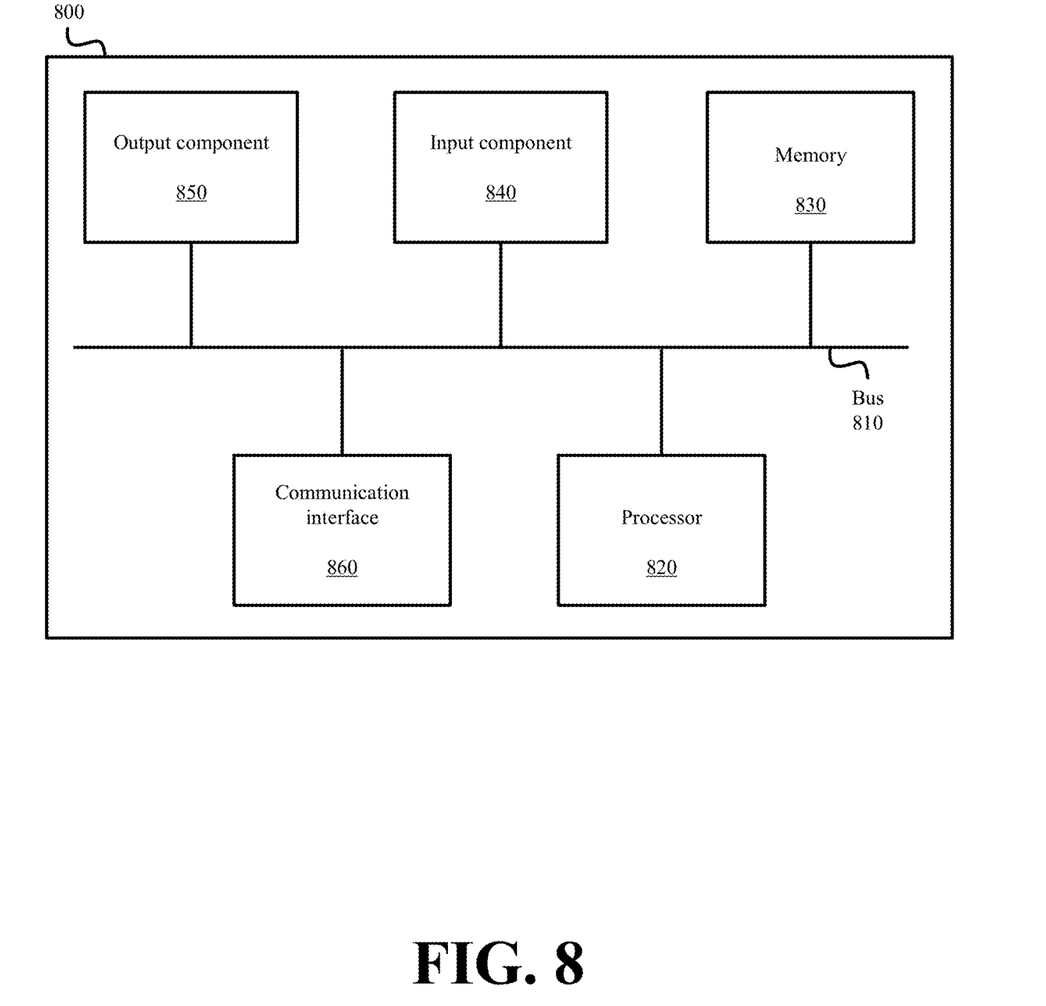
FIG. 8 illustrates example components of one or more devices, according to one or more embodiments described herein.

FIG. 8 is a diagram of example components of device 800. Device 800 may be used to implement one or more of the devices or systems described above (e.g., compression system 200). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
  receiving a compressed animation;
  generating a first frame of a three-dimensional (3D) animation based on a first set of constructs associated with a first reference 3D model that is extracted from the compressed animation and that generates the first frame without referencing data from other frames of the 3D animation, wherein each construct of the first set of constructs is defined with a position and visual characteristics to present at the position defined for the construct;
  generating one or more frames of the 3D animation that are presented after the first frame based on a first transform that is associated with a first subset of constructs from the first set of constructs, wherein the first transform is defined in the compressed animation after a definition of the first reference 3D model, wherein generating the one or more frames comprises changing the position of each construct from the first subset of constructs according to a movement specified by the first transform over the one or more frames; and
  generating a next frame of the 3D animation that is presented after the one or more frames based on a second set of constructs associated with a second reference 3D model that is defined after the first transform in the compressed animation, wherein generating the next frame comprises adjusting positions of the first subset of constructs that were changed by the first transform and positions of other constructs of the first set of constructs according to updated positions specified for each construct of the first subset of constructs and the other constructs in the second reference 3D model.

2. The method of claim 1, wherein generating the one or more frames further comprises:
  rendering the first subset of constructs at adjusted positions defined by the first transform and with a second subset constructs from the set of constructs at the position that is specified for each construct of the second subset of constructs in the first frame.

3. The method of claim 1 further comprising:
   determining that the first transform is associated with a duration that spans the one or more frames of the compressed animation that come after the first frame; and
   generating the one or more frames by changing the position of each construct from the first subset of constructs in a second frame to a new position in a third frame of the 3D animation by continuing the movement specified by the first transform from the second frame to the third frame.

4. The method of claim 1, wherein generating the one or more frames further comprises:
   adjusting the position that is defined for each construct of the first subset of constructs in the first frame by a first amount that moves the first subset of constructs closer to an end position associated with the movement specified by the first transform.

5. The method of claim 4 further comprising:
   generating a last frame of the one or more frames by adjusting the position that is defined for each construct of the first subset of constructs by a second amount that moves the first subset of constructs to the end position.

6. The method of claim 1 further comprising:
   determining that a second subset of constructs from the first set of constructs is associated with a second transform of the compressed animation; and
   wherein generating the one or more frames further comprises:
      changing the position of each construct from the second subset of constructs according to a second movement specified by the second transform that is different than the movement specified by the first transform.

7. The method of claim 1, wherein the first transform is defined as a function that creates a shape that tracks the movement.

8. The method of claim 1, wherein each construct of the first set of constructs corresponds to a point, mesh, or polygon.

9. The method of claim 1 further comprising:
   applying the first transform to the first subset of constructs based on the first transform being defined with indices or identifiers of each construct from the first subset of constructs.

10. The method of claim 1 further comprising:
    determining that each construct of the first subset of constructs is defined with an identifier of the first transform; and
    applying the movement specified by the first transform to the first subset of constructs in response to determining that each construct of the first subset of constructs is defined with the identifier of the first transform.

11. The method of claim 1, wherein changing the position of each construct from the first subset of constructs comprises:
    changing the position of a first construct from the first subset of constructs by a first amount and the position of a second construct from the first subset of constructs by a different second amount based on a different weight associated with the first construct and the second construct that modifies an amount of the movement that is applied to the position of the first transform and to the position of the second construct.

12. The method of claim 1 further comprising:
    generating one or more frames of the 3D animation that are presented after the next frame based on a second transform that is defined after the second reference 3D model in the compressed animation and that is associated with a second subset of constructs from the second set of constructs, wherein generating the one or more frames that are presented after the next frame comprises changing the position of each construct from the second subset of constructs according to a movement specified by the second transform.

13. The method of claim 1 further comprising:
    determining a time parameter and an end position that are associated with the first transform; and
    applying the movement specified by the first transform to the first subset of constructs evenly across the one or more frames so that the first subset of constructs are repositioned to the end position by the time parameter.

14. The method of claim 1 further comprising:
    determining a number of frames during which the movement specified by the first transform is applied; and
    applying the movement specified by the first transform to the first subset of constructs over the one or more frames that equal to the number of frames.

15. The method of claim 1 further comprising:
    determining that the movement specified by the first transform ends at a second frame and that a second transform specifies a different second movement to apply to the first subset of constructs at a third frame that is after the second frame; and
    generating the third frame by adjusting the position of each construct of the first subset of constructs in the second frame by the different second movement that is specified by the second transform.

16. A system for generating an animation, the system comprising:
    one or more hardware processors configured to:
       receive a compressed animation;
       generate a first frame of a three-dimensional (3D) animation based on a first set of constructs associated with a first reference 3D model that is extracted from the compressed animation and that generates the first frame without referencing data from other frames of the 3D animation, wherein each construct of the first set of constructs is defined with a position and visual characteristics to present at the position defined for the construct;
       generate one or more frames of the 3D animation that are presented after the first frame based on a first transform that is associated with a first subset of constructs from the first set of constructs, wherein the first transform is defined in the compressed animation after a definition of the first reference 3D model, wherein generating the one or more frames comprises changing the position of each construct from the first subset of constructs according to a movement specified by the first transform over the one or more frames; and
       generate a next frame of the 3D animation that is presented after the one or more frames based on a second set of constructs associated with a second reference 3D model that is defined after the first transform in the compressed animation, wherein generating the next frame comprises adjusting positions of the first subset of constructs that were changed by the first transform and positions of other constructs of the first set of constructs according to updated positions specified for each construct of the first subset of constructs and the other constructs in the second reference 3D model.

17. The system of claim 16, wherein generating the one or more frames further comprises:

rendering the first subset of constructs at adjusted positions defined by the first transform and with a second subset constructs from the set of constructs at the position that is specified for each construct of the second subset of constructs in the first frame.

18. The system of claim 16, wherein the one or more hardware processors are further configured to:

determine that the first transform is associated with a duration that spans the one or more frames of the compressed animation that come after the first frame; and generate the one or more frames by changing the position of each construct from the first subset of constructs in a second frame to a new position in a third frame of the 3D animation by continuing the movement specified by the first transform from the second frame to the third frame.

19. A non-transitory computer-readable medium storing program instructions that, when executed by one or more hardware processors of an animation system, cause the animation system to perform operations comprising:

receiving a compressed animation;

generating a first frame of a three-dimensional (3D) animation based on a first set of constructs associated with a first reference 3D model that is extracted from the compressed animation and that generates the first frame without referencing data from other frames of the 3D animation, wherein each construct of the first set of constructs is defined with a position and visual characteristics to present at the position defined for the construct;

generating one or more frames of the 3D animation that are presented after the first frame based on a first transform that is associated with a first subset of constructs from the first set of constructs, wherein the first transform is defined in the compressed animation after a definition of the first reference 3D model, wherein generating the one or more frames comprises changing the position of each construct from the first subset of constructs according to a movement specified by the first transform over the one or more frames; and generating a next frame of the 3D animation that is presented after the one or more frames based on a second set of constructs associated with a second reference 3D model that is defined after the first transform in the compressed animation, wherein generating the next frame comprises adjusting positions of the first subset of constructs that were changed by the first transform and positions of other constructs of the first set of constructs according to updated positions specified for each construct of the first subset of constructs and the other constructs in the second reference 3D model.

\* \* \* \* \*